(12) United States Patent
Norris et al.

(10) Patent No.: US 10,970,879 B2
(45) Date of Patent: Apr. 6, 2021

(54) FORMULATION SYSTEMS AND METHODS EMPLOYING TARGET COATING DATA RESULTS

(71) Applicant: PPG Industries Ohio, Inc., Cleveland, OH (US)

(72) Inventors: Alison M. Norris, Avon, OH (US); Paul Beymore, Vermilion, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 355 days.

(21) Appl. No.: 15/963,686

(22) Filed: Apr. 26, 2018

(65) Prior Publication Data
US 2019/0333246 A1    Oct. 31, 2019

(51) Int. Cl.
| | | |
|---|---|---|
| G06T 7/90 | (2017.01) | |
| G01J 3/28 | (2006.01) | |
| G01J 3/50 | (2006.01) | |
| G01N 21/25 | (2006.01) | |

(Continued)

(52) U.S. Cl.
CPC .............. *G06T 7/90* (2017.01); *G01J 3/2823* (2013.01); *G01J 3/504* (2013.01); *G01N 21/251* (2013.01); *G06N 3/0472* (2013.01); *G06T 7/0004* (2013.01); *G01N 2201/1293* (2013.01);

(Continued)

(58) Field of Classification Search
CPC ......... G01N 2201/1293; G01N 21/251; G06N 7/005; G06N 3/0472; G01J 3/504; G01J 3/2823; G06T 2207/30156; G06T 7/90; G06T 7/0004; G06T 2207/20076
See application file for complete search history.

(56) References Cited

U.S. PATENT DOCUMENTS

| | | | |
|---|---|---|---|
| 3,927,944 | A | 12/1975 | Iwahashi |
| 3,972,617 | A | 8/1976 | Shibata |
| 4,092,069 | A | 5/1978 | Fukuda |

(Continued)

FOREIGN PATENT DOCUMENTS

| | | |
|---|---|---|
| CN | 1635957 | 7/2005 |
| CN | 1797420 | 7/2006 |

(Continued)

OTHER PUBLICATIONS

Alice vs CLS Bank (Supreme Court Decision) (2013).

(Continued)

*Primary Examiner* — Mischita L Henson
(74) *Attorney, Agent, or Firm* — Workman Nydegger

(57) ABSTRACT

A computer system for seeding a formulation engine receives spectrometric data from a target coating. The computer system processes the spectrometric data through a probabilistic colorant analysis. The probabilistic colorant analysis generates a set of colorants. Each colorant within the set of colorants is associated with a calculated probability that the associated colorant is present within the target coating. Additionally, the computer system adds at least a portion of the colorants within the set of colorants to a formulation engine. The portion of the colorants is added to the formulation engine in order of decreasing probability. Further, the computer system generates, from an output of the formulation engine, a coating formulation that is calculated to match the target coating within a predetermined qualitative threshold.

19 Claims, 5 Drawing Sheets

(51) Int. Cl.
*G06N 3/04* (2006.01)
*G06T 7/00* (2017.01)
(52) U.S. Cl.
CPC ............... *G06T 2207/20076* (2013.01); *G06T 2207/30156* (2013.01)

(56) References Cited

U.S. PATENT DOCUMENTS

| | | |
|---|---|---|
| 4,164,374 A | 8/1979 | Lambe |
| 4,344,142 A | 8/1982 | Diehr, II |
| 4,479,718 A | 10/1984 | Alman |
| 4,544,424 A | 10/1985 | Take |
| 4,711,580 A | 12/1987 | Venable |
| 5,231,472 A | 7/1993 | Marcus |
| 5,319,437 A | 6/1994 | Van Aken |
| 5,590,251 A | 12/1996 | Takagi |
| 5,612,928 A | 3/1997 | Haley |
| 5,926,262 A | 7/1999 | Jung |
| 6,056,821 A | 5/2000 | Nihongi |
| 6,166,841 A | 12/2000 | Pringle |
| 6,249,751 B1 | 6/2001 | Asaba et al. |
| 6,449,384 B2 | 9/2002 | Di Venuto |
| 6,539,325 B1 | 3/2003 | Numata |
| 6,794,669 B2 | 9/2004 | Chelvayohan et al. |
| 7,809,155 B2 | 10/2010 | Nestares |
| 7,944,561 B2 | 5/2011 | Nisper et al. |
| 8,345,252 B2 | 1/2013 | Nisper et al. |
| 8,606,731 B2 | 12/2013 | Fujieda et al. |
| 8,879,066 B2 | 11/2014 | Norris |
| 9,007,588 B1 | 4/2015 | Igarashi |
| 9,482,657 B2 | 11/2016 | Bell |
| 2003/0208345 A1 | 11/2003 | O'Neill |
| 2004/0111435 A1 | 6/2004 | Herbert et al. |
| 2004/0218182 A1 | 11/2004 | Alman et al. |
| 2005/0128484 A1 | 6/2005 | Rodrigues |
| 2005/0169518 A1 | 8/2005 | Boston et al. |
| 2005/0206383 A1 | 9/2005 | Park |
| 2006/0030060 A1 | 2/2006 | Noguchi et al. |
| 2006/0045831 A1 | 3/2006 | Galembeck |
| 2006/0176479 A1 | 8/2006 | Laurence et al. |
| 2006/0245632 A1 | 11/2006 | Nisper et al. |
| 2007/0019887 A1 | 1/2007 | Nestares |
| 2007/0172113 A1 | 7/2007 | Sai et al. |
| 2007/0200337 A1 | 8/2007 | Johnson et al. |
| 2007/0226158 A1 | 9/2007 | Woronow |
| 2007/0250273 A1 | 10/2007 | De Haas |
| 2007/0263265 A1 | 11/2007 | Sekine |
| 2008/0052023 A1* | 2/2008 | Kettler ................. G01J 3/462 702/82 |
| 2008/0177586 A1 | 7/2008 | Jamjoom |
| 2008/0235224 A1 | 9/2008 | Rodrigues |
| 2008/0278592 A1 | 11/2008 | Kuno et al. |
| 2008/0278723 A1 | 11/2008 | Merchak |
| 2009/0015835 A1 | 1/2009 | Balakrishnen et al. |
| 2009/0157212 A1 | 6/2009 | McClanahan |
| 2009/0190839 A1 | 7/2009 | Higgins |
| 2009/0213120 A1 | 8/2009 | Nisper et al. |
| 2009/0292520 A1 | 11/2009 | Nwankpa |
| 2010/0048242 A1 | 2/2010 | Rhoads |
| 2010/0228511 A1 | 9/2010 | Chin et al. |
| 2011/0045517 A1 | 2/2011 | Derringer et al. |
| 2011/0170796 A1 | 7/2011 | Qian et al. |
| 2011/0242562 A1 | 10/2011 | Vrhel |
| 2011/0282613 A1 | 11/2011 | Skinner |
| 2012/0225190 A1 | 9/2012 | Steenhoek |
| 2012/0243797 A1 | 9/2012 | Di Venuto |
| 2012/0303376 A1 | 11/2012 | Shishido |
| 2013/0096438 A1 | 4/2013 | Fehre et al. |
| 2013/0244197 A1 | 9/2013 | Tijoe |
| 2014/0078293 A1 | 3/2014 | Beymore |
| 2014/0118936 A1 | 5/2014 | Merlet et al. |
| 2014/0242271 A1 | 8/2014 | Prakash et al. |
| 2014/0250109 A1 | 9/2014 | Wang |
| 2014/0278251 A1 | 9/2014 | Norris |
| 2014/0278253 A1 | 9/2014 | Beymore |
| 2014/0278254 A1 | 9/2014 | Beymore |
| 2015/0023054 A1 | 1/2015 | Goda |
| 2015/0127269 A1 | 5/2015 | Bell |
| 2015/0134269 A1 | 5/2015 | Norris |
| 2015/0134299 A1 | 5/2015 | Norris |
| 2015/0134300 A1 | 5/2015 | Norris |
| 2016/0307602 A1 | 10/2016 | Mertens |
| 2017/0107576 A1 | 4/2017 | Babiarz et al. |
| 2017/0184452 A1 | 6/2017 | Baron et al. |
| 2017/0233787 A1 | 8/2017 | Sebba et al. |
| 2018/0125207 A1 | 5/2018 | Shami |
| 2019/0120695 A1 | 4/2019 | Liefferink |
| 2019/0301935 A1 | 10/2019 | Borremans et al. |
| 2019/0332254 A1 | 10/2019 | Norris et al. |

FOREIGN PATENT DOCUMENTS

| | | |
|---|---|---|
| CN | 101184986 | 5/2008 |
| CN | 101646929 | 2/2010 |
| CN | 101784871 | 7/2010 |
| CN | 102549545 | 7/2012 |
| JP | 07150081 | 6/1995 |
| JP | 2002236850 | 8/2002 |
| JP | 2006053070 A | 2/2006 |
| JP | 2006277555 | 10/2006 |
| JP | 2006284601 A | 10/2006 |
| JP | 2007218895 | 8/2007 |
| JP | 2008039525 A | 2/2008 |
| JP | 2008215914 A | 9/2008 |
| JP | 2010242018 | 10/2010 |
| KR | 20100102147 | 9/2010 |
| TW | 200608310 | 3/2006 |
| TW | 200821602 | 5/2008 |
| TW | I298466 | 7/2008 |
| TW | 200834273 | 8/2008 |
| TW | 201339652 | 10/2013 |
| WO | 2003063719 | 8/2003 |
| WO | 2006096521 | 9/2006 |
| WO | 2006112864 | 10/2006 |
| WO | 2007096402 | 1/2009 |
| WO | 2013049792 | 4/2013 |
| WO | 2013116192 | 8/2013 |
| WO | 2014150337 | 9/2014 |

OTHER PUBLICATIONS

Anonymous, "Chapter 1.3.5.17. Detection of Outliers", NIST/Sematech e-Handbook of Statistical Methods, Jan. 1, 2012, Xp055162021.

Beymore, Paul M. U.S. Appl. No. 14/121,869, "Pigment Identification of Complex Coating Mixtures with Sparkle Color", filed Oct. 28, 201.

D. Puig, M.A. Garcia, J. Melendez: "Application-(dependent feature slection for texture classification", Pattern Recognition, vol. 43, No. 10, May 10, 2010 (May 10, 2010) pp. 3182-3297, XP027095420, DOI: 10.1016/j.patcog.2010.05.005 abstract and section 3.

E. Kirchner: "Appearance and measurement modeling an drendering of hte visual texture of automotive paints", Detroit Color Council, Mar. 13, 2013, XP055153196, Retreived from the Internet: URL: http://www.detroitcc.org/files/2013March14b.pdf, [retreived on Apr. 3, 2013] Models for predicting texture.

E.J.J Kirchner, J. Ravi: "Setting tolerances on color and texture for automotive coating", Color Research & Application, vol. 39, No. 1, Jul. 25, 2012 pp. 88-98, XP055152561, DOI: 10.1002/col.21767.

Harkins et al. "Identification of pigments in paint products by infrared spectroscopy," Analytical Chemistry, 1959.

I. Lissner, U. Philipp: "Upgrading Color-Difference Formulas", Jouranl fo the Optical Society of America, vol. 27, No. 7, Jun. 11, 2010 (Jun. 11, 2010), pp. 1620-1629, XP055152562, DOI: 10,1364/JOSAA.27.001620 Sections 1 and 2.A.

International Search Report and Written Opinion for application No. PCT/US2014/022983 dated Nov. 28, 2014.

J.H. Xin, S. Shao, K.F.-L. Chung: "Colour-appearance modelling using feedforward networks with Bayesian regulariztion method—part 1: forward model" Color Research & Application, vol. 25, No.

(56) References Cited

OTHER PUBLICATIONS

6, Oct. 13, 2000, pp. 424-434, XP055152560, DOI: 10.1002/1520-6378(200012)25:6<424:"AID_COL7>3.0CO;2-Q.
Janina et al. "Examination of multilayer paint coats by the use of infrared, Raman and XRF spectroscopy for forensic purposes" J. of Molecular Structure, 2006.
Kokla, Vassiliki et al. "A Bayesian decision model for watercolour analysis," Proc. of SPIE, 2007, vol. 6618, pp. 66180S-1-66180S-9.
Kuncheva, Ludmila I., James C. Bezdek, and Robert PW Duin, "Decision templates for multiple classifier fusion: an experimental comparison" Pattern Recognition, 34.2. 2001.
Massonnet et al. "Identification of organic pigments in coatings: applications to red automotive topcoats" First Meeting of the European Academy of Forensic Sciences, 1997.
Paravina et al. "Evaluation of blending effect of composites related to restoration size", Dental Materials, Elsevier, Amsterdam, NL, vol. 22, No. 4, Apr. 1, 2006, pp. 299-307, XP027943381, ISSN: 0109-5641 table 2.
PPG Automotive Refinish: "RapidMatchTMX-5: guida utente", Pittsburgh Plate Glass (PPG) Industries, 2013, XP055153237, retreived from the internet: URL: http://it.nexaautocolor.com/media/213903/rapidmatch_v1-2012_email_version.pdf [retreived on Sep. 22, 2014].
Rafik, "Bulk optical properties of phthalocayanin pigment particles", Can. J. Chem. 1980.
Sun, et al. Crooks in Molecular Interaction Between Organized, Surface Confided Monolayers and Vapor-Phas Probe Molecules. 5. Acid-Based Interactions, 1993, American Chemical Society, pp. 1775-1780.
Takagi et al. "Prediction of spectral reflectance factor distribution of color-shift paint finishes" Color Research & Application, John Wiley and Sons, Inc., US, vol. 32, No. 5, Oct. 1, 2007, pp. 378-387, XP002604927, ISSN: 0361-2317.
Takuro Yonesawa, "An Event Decription Language Using Temporal Relation for Smart Object Services", IPSJ SIG Technical Report 2008-MBL-44, Mobile computing and ubiquitous communication, 2008-UBI-17, Ubiquitous computing system, Information Processing Society of Japan, Feb. 27, 2008, vol. 2008, No. 18, pp. 75-82.
Wang Qiang "Texture Analysis and Classification Based on Bayesian Network Model", Computer Aided Design & Computer Graphics, Dec. 31, 2007, pp. 1565-1568.
Chinese Office Action for application No. 201480015524.6 dated Dec. 26, 2016.
Chinese Office Action for application No. 201480015523.1 dated Feb. 7, 2017.
Japanese Office Action for application No. JP2016-501119 dated Nov. 7, 2016.
Korean Office Action for application No. 2015-7025129 dated Dec. 29, 2016.
Korean Office Action for application No. 2015-07025129 dated Jun. 21, 2016.
Korean Office Action for application No. 2015-7025121 dated Jan. 31, 2017.
Korean Office Action for application No. 2015-7025121 dated Jul. 25, 2016.
Office Action in application No. 201480070100.x dated Feb. 27, 2017.
Taiwan Office Action for application No. 103109480 dated Jul. 17, 2016.
Office Action for U.S. Appl. No. 13/832,116 dated Mar. 5, 2014.
Office Action for U.S. Appl. No. 13/835,675 dated Sep. 16, 2015.
Office Action for U.S. Appl. No. 13/832,554 dated Sep. 23, 2015.
Office Action for U.S. Appl. No. 13/835,675 dated Feb. 4, 2016.
Office Action for U.S. Appl. No. 13/832,554 dated Apr. 20, 2016.
Notice of Allowance for U.S. Appl. No. 13/835,675 dated Nov. 1, 2016.
Office Action for U.S. Appl. No. 14/535,399 dated Apr. 4, 2017.
Office Action for U.S. Appl. No. 14/535,380 dated Apr. 12, 2017.
Office Action for U.S. Appl. No. 13/832,554 dated May 2, 2017.
Office Action for U.S. Appl. No. 13/835,675 dated May 2, 2017.
Office Action for U.S. Appl. No. 14/535,372 dated Jun. 20, 2017.
Office Action for U.S. Appl. No. 13/832,554 dated Sep. 6, 2017.
Office Action for U.S. Appl. No. 14/535,372 dated Oct. 6, 2017.
Office Action for U.S. Appl. No. 14/535,380 dated Oct. 27, 2017.
Office Action for U.S. Appl. No. 14/535,399 dated Nov. 1, 2017.
Office Action for U.S. Appl. No. 13/835,675 dated Dec. 12, 2017.
Office Action for U.S. Appl. No. 13/832,554 dated Dec. 12, 2017.
Office Action for U.S. Appl. No. 14/535,372 dated Feb. 15, 2018.
Office Action for U.S. Appl. No. 14/535,399 dated Mar. 21, 2018.
Office Action dated Mar. 26, 2018 from U.S. Appl. No. 13/832,554, filed Mar. 15, 2013.
Office Action dated Oct. 30, 2018 from U.S. Appl. No. 13/832,554, filed Mar. 15, 2013.
Notice of Allowance dated Jul. 9, 2019 from U.S. Appl. No. 13/832,554, filed Mar. 15, 2013.
Notice of Allowance dated Aug. 9, 2019 from U.S. Appl. No. 13/832,554, filed Mar. 15, 2013.
Office action dated Jul. 31, 2017 from Chinese Patent Application No. 201480015524 filed Mar. 10, 2014.
Notice of Grant dated Nov. 3, 2017 from Chinese Patent Application No. 201480015524 filed Mar. 10, 2014.
International Search Report dated Dec. 4, 2014 from International Patent Application No. PCT/US2014/022369 filed Mar. 10, 2014.
International Preliminary Report on Patentability dated Sep. 15, 2015 from International Patent Application No. PCT/US2014/022369 filed Mar. 10, 2014.
Office action dated Feb. 28, 2017 from Korean Patent Application No. 20157025129 filed Mar. 10, 2014.
Exam Report dated Apr. 10, 2019 from European Patent Application No. 14717546 filed Mar. 10, 2014.
Office Action dated Oct. 14, 2016 from Japanese Patent Application No. 2016500952 filed Mar. 10, 2014.
Office Action dated Jun. 16, 2017 from Japanese Patent Application No. 2016500952 filed Mar. 10, 2014.
Decision to Grant dated Feb. 2, 2018 from Japanese Patent Application No. 2016500952 filed Mar. 10, 2014.
Office Action dated Dec. 15, 2016 from Canadian Patent Application No. 2903458 filed Mar. 10, 2014.
Notice of Allowance dated Apr. 13, 2018 from U.S. Appl. No. 13/835,675, filed Mar. 15, 2013.
Notice of Allowance dated Aug. 7, 2018 from U.S. Appl. No. 13/835,675, filed Mar. 15, 2013.
Issue Notification dated Nov. 14, 2018 from U.S. Appl. No. 13/835,675, filed Mar. 15, 2013.
International Search Report dated Nov. 28, 2014 from International Patent Application No. PCT/US2014/022983 filed Mar. 11, 2014.
International Report on Patentability dated Sep. 15, 2015 from International Patent Application No. PCT/US2014/022983 filed Mar. 11, 2014.
Office Action dated Aug. 11, 2017 from Chinese Patent Application No. 201480015523.1 filed Mar. 11, 2014.
Notification of Grant dated Dec. 14, 2017 from Chinese Patent Application No. 201480015523.1 filed Mar. 11, 2014.
Decision to Grant dated May 16, 2017 from Japanese Patent Application No. 2016-50119 filed Mar. 11, 2014.
Office Action dated Dec. 9, 2016 from Canadian Patent Application No. 2903466 filed Mar. 11, 2014.
Niedzinski, Cezary et al. and Bayesian Approach to Spectrophotometric Analysis of Multicomponent Substances and IEEE Transactions on Instrumentation and Measurement, Jun. 2000, vol. 49, No. 3, pp. 67-642.
Office Action for U.S. Appl. No. 13/832,554 dated Mar. 26, 2018.
Office Action for U.S. Appl. No. 14/535,380 dated Apr. 2, 2018.
Office Action for U.S. Appl. No. 14/535,372 dated Apr. 26, 2018.
Notice of Allowance received for U.S. Appl. No. 15/963,790, dated Oct. 21, 2020.
Int'l Preliminary Report on Patentability for Application No. PCT/US2014/022369 (filed Mar. 10, 2014), dated Sep. 15, 2015.
Issue Notification for U.S. Appl. No. 13/835,675, filed Mar. 15, 2013, dated Nov. 14, 2018.
Non-Final Office Action for U.S. Appl. No. 15/963,567, dated Sep. 4, 2020, 8 pages.
Non-Final Office Action for U.S. Appl. No. 15/963,790, dated Apr. 15, 2020, 7 pages.

(56) References Cited

OTHER PUBLICATIONS

Notice of Allowance for U.S. Appl. No. 13/835,675, filed Mar. 15, 2013, dated Aug. 7, 2018.
Notice of Allowance for U.S. Appl. No. 15/963,790, Jul. 29, 2020, 7 pages.
Notice of Reasons for Refusal for Japanese Application No. 2016-501119, dated Nov. 7, 2016, 8 pages (4 pages of English Translation and 4 pages of Original Document).
Taiwan Office Action for Application No. 103109480, dated Sep. 17, 2015.

* cited by examiner

| Wavelength | Angle | Reflectance Factor | | | | |
|---|---|---|---|---|---|---|
| | | | _132 | 550 | 45 | 2.13 |
| 400 | 15 | 22.03 | | 560 | 45 | 2.01 |
| 410 | 15 | 25.94 | | 570 | 45 | 1.92 |
| 420 | 15 | 27.88 | | 580 | 45 | 1.88 |
| 430 | 15 | 29.03 | | 590 | 45 | 1.86 |
| 440 | 15 | 29.67 | | 600 | 45 | 1.84 |
| 450 | 15 | 30.04 | | 610 | 45 | 1.83 |
| 460 | 15 | 30.02 | | 620 | 45 | 1.84 |
| 470 | 15 | 29.73 | | 630 | 45 | 1.91 |
| 480 | 15 | 29.09 | | 640 | 45 | 2.03 |
| 490 | 15 | 28.24 | | 650 | 45 | 2.19 |
| 500 | 15 | 27.12 | | 660 | 45 | 2.35 |
| 510 | 15 | 25.56 | | 670 | 45 | 2.49 |
| 520 | 15 | 23.79 | | 680 | 45 | 2.65 |
| 530 | 15 | 22.04 | | 690 | 45 | 2.85 |
| 540 | 15 | 20.62 | | 700 | 45 | 3.08 |
| 550 | 15 | 19.31 | | 400 | 110 | 0.86 |
| 560 | 15 | 17.93 | | 410 | 110 | 0.99 |
| 570 | 15 | 16.91 | | 420 | 110 | 1.02 |
| 580 | 15 | 16.36 | | 430 | 110 | 1 |
| 590 | 15 | 16.11 | | 440 | 110 | 0.98 |
| 600 | 15 | 16.03 | | 450 | 110 | 0.95 |
| 610 | 15 | 15.85 | | 460 | 110 | 0.93 |
| 620 | 15 | 15.8 | | 470 | 110 | 0.89 |
| 630 | 15 | 16.15 | | 480 | 110 | 0.86 |
| 640 | 15 | 17.16 | | 490 | 110 | 0.82 |
| 650 | 15 | 18.55 | | 500 | 110 | 0.77 |
| 660 | 15 | 19.99 | | 510 | 110 | 0.74 |
| 670 | 15 | 21.23 | | 520 | 110 | 0.69 |
| 680 | 15 | 22.45 | | 530 | 110 | 0.65 |
| 690 | 15 | 23.92 | | 540 | 110 | 0.61 |
| 700 | 15 | 25.74 | | 550 | 110 | 0.59 |
| 400 | 45 | 2.58 | | 560 | 110 | 0.57 |
| 410 | 45 | 3 | | 570 | 110 | 0.57 |
| 420 | 45 | 3.14 | | 580 | 110 | 0.57 |
| 430 | 45 | 3.21 | | 590 | 110 | 0.57 |
| 440 | 45 | 3.26 | | 600 | 110 | 0.56 |
| 450 | 45 | 3.27 | | 610 | 110 | 0.57 |
| 460 | 45 | 3.25 | | 620 | 110 | 0.58 |
| 470 | 45 | 3.21 | | 630 | 110 | 0.6 |
| 480 | 45 | 3.14 | | 640 | 110 | 0.64 |
| 490 | 45 | 3.03 | | 650 | 110 | 0.68 |
| 500 | 45 | 2.92 | | 660 | 110 | 0.71 |
| 510 | 45 | 2.77 | | 670 | 110 | 0.74 |
| 520 | 45 | 2.59 | | 680 | 110 | 0.78 |
| 530 | 45 | 2.41 | | 690 | 110 | 0.83 |
| 540 | 45 | 2.26 | | 700 | 110 | 0.89 |

*Fig. 5*

| Colorant | Probability |
|---|---|
| A | 0 |
| B | 7.58 E-18 |
| C | 6.02 E-21 |
| D | 0 |
| E | 3.05 E-05 |
| F | 0.00242 |
| G | 0.00253 |
| H | 1 |
| I | 6.7 E-27 |
| J | 0 |
| K | 0 |
| L | 0 |
| M | 1 |
| N | 0.00798 |
| O | 0 |
| P | 0 |
| Q | 0 |
| R | 0 |
| S | 0 |
| T | 0 |
| U | 0 |
| V | 0 |
| W | 1.38 E-26 |
| X | 1 |
| Y | 1 |
| Z | 0 |

FORMULATION SYSTEMS AND METHODS EMPLOYING TARGET COATING DATA RESULTS

BACKGROUND

Modern coatings provide several important functions in industry and society. Coatings can protect a coated material from corrosion, such as rust. Coatings can also provide an aesthetic function by providing a particular color and/or texture to an object. For example, most automobiles are coated using paints and various other coatings in order to protect the metal body of the automobile from the elements and also to provide aesthetic visual effects.

In view of the wide-ranging uses for different coatings, it is often necessary to identify a target coating composition. For instance, it might be necessary to identify a target coating on an automobile that has been in an accident. If the target coating is not properly identified, any resulting repair to the automobile's coating will not match the original coating. As used herein, a target coating comprises any coating of interest that has been applied to any physical object.

Automotive coatings provide a particularly challenging set of coating parameters to match. In addition to complex colorants, such as pigments, dyes, and inks, a conventional automotive coating may comprise effect pigments such as effect pigments that provide texture to the coating. For instance, an automotive coating may comprise an effect pigment such as aluminum flakes of a particular color. The aluminum flakes may provide a texture that appears to sparkle. A proper identification of such a coating composition may require the correct identification of the presence of aluminum flakes and a proper identification of the color of the aluminum flakes.

In order to properly match a target coating, manufacturers desire to determine the components, or colorants, within the target coating. If the same colorants or appropriate offsets as those in the target coating are utilized, a formulation or search process may arrive at an apparent optimum solution as to the formulation of the target coating. On the other hand, excluding those colorants, either deliberately or inadvertently, from availability will result in a less than optimal color match.

Thus, there is a need for coating identification methods and systems that are faster, more accurate, and more flexible than the conventional systems that are currently available.

BRIEF SUMMARY

A computer system for seeding a formulation engine comprises one or more processors and one or more computer-storage media having stored thereon executable instructions that when executed by the one or more processors configure the computer system to perform various actions. For example, the computer system can receive spectrometric data from a target coating. The computer system can also process the spectrometric data through a probabilistic colorant analysis. The probabilistic colorant analysis generates a set of colorants. Each colorant within the set of colorants is associated with a calculated probability that the associated colorant is present within the target coating. Additionally, the computer system can add at least a portion of the colorants within the set of colorants to a formulation engine. The portion of the colorants are added to the formulation engine in order of decreasing probability, whereupon the computer system generates, from an output of the formulation engine, a coating formulation that is calculated to match the target coating within a predetermined qualitative or quantitative threshold.

A computerized method for seeding a formulation engine comprises receiving spectrometric data from a target coating, such as at a computer terminal. The method also comprises processing the spectrometric data through a probabilistic colorant analysis, wherein the probabilistic colorant analysis generates a set of colorants. Each colorant within the set of colorants is associated with a calculated probability that the associated colorant is present within the target coating. Additionally, the method comprises adding at least a portion of the colorants within the set of colorants to a formulation engine. The method further involves adding the portion of the colorants to the formulation engine in order of decreasing probability. The method also comprises generating, from an output of the formulation engine, a coating formulation that is calculated to match the target coating within a predetermined qualitative or quantitative threshold.

A computer program product comprises one or more computer storage media having stored thereon computer-executable instructions that, when executed at a processor, cause the computer system to perform a method for seeding a formulation engine. The method comprises receiving spectrometric data from a target coating. The method also comprises processing the spectrometric data through a probabilistic colorant analysis, wherein the probabilistic colorant analysis generates a set of colorants. Each colorant within the set of colorants is associated with a calculated probability that the associated colorant is present within the target coating. Additionally, the method comprises adding at least a portion of the colorants within the set of colorants to a formulation engine. The portion of the colorants are added to the formulation engine in order of decreasing probability. The method also comprises generating, from an output of the formulation engine, a coating formulation that is calculated to match the target coating within a predetermined qualitative or quantitative threshold.

Additional features and advantages of the invention will be set forth in the description which follows, and in part will be obvious from the description, or may be learned by the practice of the present invention. The features and advantages of the present invention may be realized and obtained by means of the instruments and combinations particularly pointed out in the appended claims. These and other features will become more fully apparent from the following description and appended claims, or may be learned by the practice of the present invention as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates a table comprising spectrometric data;

DETAILED DESCRIPTION

Figure 1:
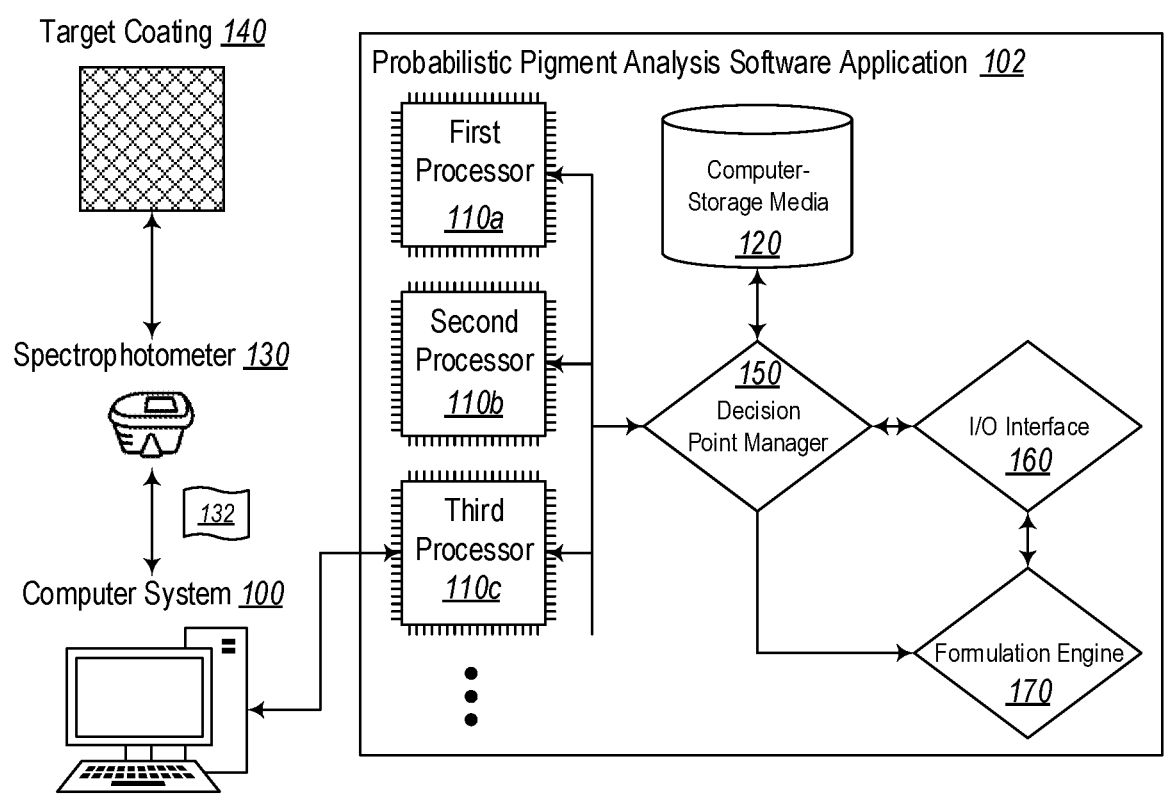
FIG. 1 illustrates a schematic diagram of a computer system for parallel processing of spectrometric data when identifying coating texture effects.

The present invention extends to computerized systems and methods for seeding a formulation engine, and for processing the information through multiple threads in parallel, hence achieving rapid and accurate coating analysis. For example, a coating identification computer system can receive spectrometric data from a target coating. The spectrometric data may be gathered by a camera, a spectrometer, such as spectrophotometer, or any other device capable of scanning a target coating and providing characterization data relating to attributes of the target coating. The spectrometric data can comprise spectrophotometric data, spectrocolorimetric data, data acquired via image processing, and/or any other similar data. The coating identification computer system processes the spectrometric data through a probabilistic colorant analysis. The probabilistic colorant analysis identifies a set of colorants that are likely present in the coating and associates with each colorant a probability that the colorant is present in the target coating. As used herein, colorants include pigments, effect pigments, dyes, inks, stains, and any other related coating or coating component. The identified set of colorants is then fed into a formulation engine in decreasing order of calculated probability of the colorant being present in the target coating until a formulation match is identified. The present invention can generate accurate, reproducible results using this approach in a matter of seconds or less.

Several conventional formulation engines and methodologies attempt to encompass colorant selection and formulation via various algorithms. These algorithms are based on spectrometric data, or characterization data relating to attributes of the target coating. For example, spectrometric data may include spectrophotometric data, spectrocolorimetric data, data acquired via image processing, and/or related metrics. Many conventional colorant identification packages and formulation engines take a "brute" force, or guess-and-check, type of approach to provide formulations and colorant information to their users. Manufacturers commonly use the guess-and-check approach, or brute force method, in which nearly all available colorants, or a subset of all available colorants, are combined in all combinations available given an end number of colorants desired in the final match.

Conventional "brute" force methods of coating identification can be inefficient. Such conventional methods may consume significant processing time and large amounts of memory to store all of the available colorants. Additionally, these methods are error prone because they tend to work on a "good enough" basis. For example, these methods are not focused on identifying the actual components of a target coating. Instead, brute force methods iterate through all available colorants, until a particular output is a good enough match to the target coating, which in many cases may comprise very different colorants than those that are in the target coating.

More recently, neural networks have seen significant interest for identifying compositions of target coatings. Unfortunately, neural networks suffer from slow performance, inflexibility, error propagation, and a requirement of significant overhead to meticulously manage a sometimes-large learning database and structure. The inflexibility, or rigid operation, forces a neural network generally to be used in a feedback design to optimize the node weightings leading to and within the hidden layers of the network.

The poor accuracy, slow performance, and high system resources required by conventional coating identification systems present significant technical challenges within the field.

The present invention can address one or more of these technical challenges. For instance, a coating identification computer system of the present invention can provide significant technical improvements over conventional coating identification and formulation systems. For example, coating identification computer systems can analytically identify potential colorants within a target coating. As used herein, "potential colorants" (also referred to as "final colorants") are colorants that are identified by a probabilistic colorant analysis as likely being in a target coating. The potential colorants are fed into a formulation engine. As such, the formulation engine is seeded with colorants that have already been identified as having a high probability of being present within the target coating. Resulting coating formulations are more likely to correctly match the formulation of the target coating because the colorants are not simply guessed-and-checked.

Additionally, a coating identification computer system can provide significant performance improvements over conventional coating identification and formulation systems. For example, instead of brute force guess-and-check methods that iterate through an entire library of colorants, the present invention can seed a formulation engine with analytically identified potential colorants from within the target coating. The potential colorants are fed into the formulation engine in order of probability. As such, resulting coating formulations are identified significantly faster than conventional methods that randomly guess, or iterate through a randomly ordered list, what colorants may be present within a coating. As noted, this can be a dramatic time savings while at the same time providing significant improvements in accuracy.

In particular, a coating identification computer system can also provide significant speed increases over neural network systems. For example, in one laboratory experiment using a test sample, a conventional neural network required 64 seconds to produce a coating identification result. In contrast, an embodiment of a disclosed coating identification system, required only 20 seconds to provide a coating identification result, which is a three-times improvement over the conventional system. A coating identification computer system may be particularly suited for parallel processing which provides significant speed increases compared to conventional systems.

Accordingly, coating identification computer systems and related methods comprise unique and innovative technical structures, processes, and applications that provide several technical benefits. For example, a coating identification computer system comprises a logical structure that easily allows for parallel processing. Additionally, a coating identification computer system calculates an entire dataset of decision points. By providing the entire dataset of decision points results, the coating identification system is able to arrive at highly accurate results that are not dependent on prior logical pathways being correctly chosen. While a few technical benefits have been explicitly pointed out for the sake of example, one will appreciate that additional technical benefits may be provided according to the present invention.

Turning now to the figures, FIG. 1 illustrates a schematic diagram of a computerized system in accordance with the present invention comprising a computer system 100 for parallel processing of spectrometric data 132 when identifying coating colorants. With respect to FIG. 1, the computer system 100 is described in the exemplary context of identifying texture effects, such as aluminum, organic mica, or man-made mica; however, one will appreciate that the computer system 100 could additionally or alternatively be used to identify any type of colorant. As used herein, a computer system used with the invention comprises any combination of one or more processors 110(*a-c*) and computer-readable storage media 120. For example, a processor (e.g., processor 110*a*) may comprise an integrated circuit, a field-programmable gate array (FPGA), a microcontroller, an analog circuit, or any other electronic circuit capable of processing input signals. Examples of computer-readable storage media 120 include RAM, ROM, EEPROM, solid state drives ("SSDs"), flash memory, phase-change memory ("PCM"), optical disk storage, magnetic disk storage or other magnetic storage devices, or any other hardware storage device(s).

The computer system 100 can comprise one or more computer-readable storage media 120 having stored thereon executable instructions that when executed by the one or more processors 110(*a-c*) configure the computer system 100 to execute a probabilistic colorant analysis software application 102. As used herein, a "probabilistic colorant analysis" comprises an analysis of a target coating 140 that produces one or more potential colorants and probabilities associated with the likelihood that each of the potential colorants is present within the target coating 140.

For example, the probabilistic colorant analysis software application 102 can cause the computer system 100 to receive spectrometric data 132 from a target coating 140. The spectrometric data 132 may be gathered by a camera, a spectrometer, such as spectrophotometer 130, or any other device capable of scanning a target coating 140 and providing characterization data relating to attributes of the target coating 140. The probabilistic colorant analysis software application 102 then processes the spectrometric data through a probabilistic colorant analysis. The probabilistic colorant analysis generates a set of potential colorants; each potential colorant within the set of potential colorants being associated with a calculated probability that the associated colorant is present within the target coating 140.

The probabilistic colorant analysis software application 102 may perform a probabilistic colorant analysis through the use of colorant decision points. For example, a decision point manager 150 initiates a set of colorant decision points. As used herein, a decision point manager 150 comprises a software and/or hardware component that manages the initiation and processing of colorant decision points within the probabilistic colorant analysis software application 102. Additionally, as used herein, a colorant decision point comprises a set of independent calculations of the spectrometric data 132 that each provide an independent assessment about the presence of a particular effect pigment type within the target coating 140 and that are individually weighted by the colorant decision point to provide a probability that the particular effect pigment type is within the target coating 140. As used herein, an independent calculation comprises an independent assessment about the presence of a particular effect pigment type within the target coating 140 that does not require as an input the output of any other independent calculation within a respective colorant decision point. Initiating a colorant decision point may comprise loading the colorant decision point from a computer-readable storage medium.

When initiating the set of colorant decision points, the decision point manager 150 may initiate multiple different decision points. For example, the decision point manager 150 may initiate a second colorant decision point for identifying a probability that a second effect pigment type is present within the target coating 100. The second colorant decision point comprises a second set of independent calculations of the spectrometric data 132 that each provide an independent assessment about the presence of the second effect pigment type within the target coating 140. The first set of independent calculations associated with a first colorant decision point may be different than the second set of independent calculations associated with the second colorant decision point. For example, the first colorant decision point may be directed towards identifying the presence of an aluminum texture effect pigment while the second colorant decision point may be directed towards identifying the presence of a mica texture effect pigment. Similarly, the second set of independent calculations associated with a second colorant decision point may be a subset of the first set of independent calculations associated with the first colorant decision point. For example, the first colorant decision point may be directed toward identifying the presence of an aluminum texture effect pigment while the second colorant decision point may be directed toward identifying the presence of lenticularly-shaped aluminum texture effect pigment.

Once the system 100 initiates the set of colorant decision points, the decision point manager 150 manages the parallel processing of the colorant decision points. The decision point manager 150 may calculate the colorant decision points in parallel by initiating a calculation of a first set of independent calculations associated with a first colorant decision point and a second set of independent calculations associated with a second colorant decision point within parallel threads. For example, the decision point manager 150 provides different colorant decision points to a first processor 110*a*, a second processor 110*b*, a third processor 110*c*, and so forth. One of skill in the art will appreciate that modern processing units comprise various different parallel processing functionalities and capabilities. For instance, many modern processing units comprise multiple cores on a single silicon die. Further, some modern processing units also provide multiple virtual cores that allow the simultaneous processing of multiple threads on a single core.

The decision point manager 150 represents an abstraction of the multi-threaded nature of the colorant decision points. At least a portion of the colorant decision points are capable of being processed as independent threads within a parallel processing system. Each independent calculation within each colorant decision point may also be capable of being processed as an independent thread within a parallel processing system. The decision point manager 150 manages the parallel processing of each colorant decision point and also tracks the calculated results received from each independent calculation and each colorant decision point.

Once the parallel calculations are complete, each colorant decision point provides a probability that the particular effect pigment type is present within a target coating 140. The probabilities are each calculated based upon a weighted combination of the results of each independent calculation within the set of independent calculations. The particulars of the weighting of the "weighted combination" is described more fully below. Using the various probabilities provided by the colorant decision points, the decision point manager 150 calculates a set of final colorants and final colorant probabilities. The system 100 calculates each final colorant probability within the set of final colorant probabilities by combining a unique subset of probabilities calculated by the first set of colorant decision points. Each final colorant probability indicates a probability that an associated final colorant is present within the target coating.

Once the system 100 completes calculating the final colorant probabilities, the probabilistic colorant analysis software application 102 within the system 100 may provide at least a portion of the final colorant probabilities to an end user through an input/output (I/O) interface 160. The I/O interface may comprise a computer display that renders instructions from the software application to list a particular number of the final colorant probabilities in order of highest probability. The end user is then able to manually review the list shown on the display, and identify colorants of interest.

Additionally, the probabilistic colorant analysis software application 102 can add at least a portion of the colorants within the set of final colorants to a formulation engine (e.g., 170). As used herein "final colorants" or "potential colorants" refer to colorants that are identified by the probabilistic colorant analysis software application 102 as potentially being present within a target coating 140, and/or that the user has accepted for submission into the formulation engine. Each final colorant is associated with a probability (also referred to herein as a "final colorant probability" or "potential colorant probability") that indicates the likelihood that the final colorant is present within the target coating. Additionally, each final colorant may be associated with calculated probabilities above a threshold probability. For example, the probabilistic colorant analysis software application 102 may limit the set of final colorants to only colorants that are associated with a probability that is above a threshold level. The system 100 can further allow the end user to accept and/or discard the colorants shown on the display. In either case, the system 100 ultimately provides a narrowed subset of colorant (the final colorants) based purely on probabilistic analysis, and/or based on a combination of probabilistic analysis and human input.

The formulation engine 170 may comprise any formulation process capable of generating a coating composition based upon potential colorants. For example, the formulation engine may utilize a Kubelka-Munk formulation process. The formulation engine 170 may be configurable to send resulting formulations to the I/O interface 160. The I/O interface can then display the resulting formulation to the end user and/or communicate the formulation to a coating mixing machine for production.

The probabilistic colorant analysis software application 102 can add the final colorants to the formulation engine 170 in order of decreasing calculated probability of the final colorant being present in the target coating. Using the added final colorants, the formulation engine 170 generates a coating formulation that is calculated to match the target coating within a predetermined qualitative or quantitative threshold. The predetermined qualitative threshold may be user definable and/or defined based upon analytical determinations of a threshold level of visual match between a proposed coating formulation and a target coating 140.

The probabilistic colorant analysis software application 102 can iteratively add final colorants selected from the set of final colorants to the formulation engine 170 in order of decreasing calculated probability of the final colorant being present in the target coating until the predetermined qualitative threshold is met. For example, the probabilistic colorant analysis software application 102 adds to the formulation engine 170 a first colorant associated with the highest probability within the set of final colorants.

In the case that the first colorant does not meet the predetermined qualitative threshold, the probabilistic colorant analysis software application 102 can continue to iteratively add additional colorants selected from the set of final colorants in order of decreasing calculated probability of the final colorants being present in the target coating. For instance, the probabilistic colorant analysis software application 102 can add a second colorant associated with the second highest probability within the set of final colorants. This system 100 can continue this process until the one or more of the identified colorants meet the predetermined qualitative or quantitative threshold or until the final colorants within the set of final colorants are exhausted.

For example, prior to adding at least a portion of the final colorants within the set of final colorants to the formulation engine 170, the probabilistic colorant analysis software application 102 can receive input from a user removing one or more colorants from the set of final colorants. For example, the I/O interface 160 may display the set of final colorants to the user through a computer display. The set of final colorants may also be displayed with their associated final colorant probabilities. The user interface allows a user, such as a color expert, to selectively remove certain colorants from the set of final colorants. For instance, the user may determine from the displayed list that one or more of the listed final colorants is not present in the target coating 140. Such a determination, wholly removes the selected final colorant(s) from the set of final colorants such that the selected colorant(s) is not iteratively added to the formulation engine 170.

Figure 2:
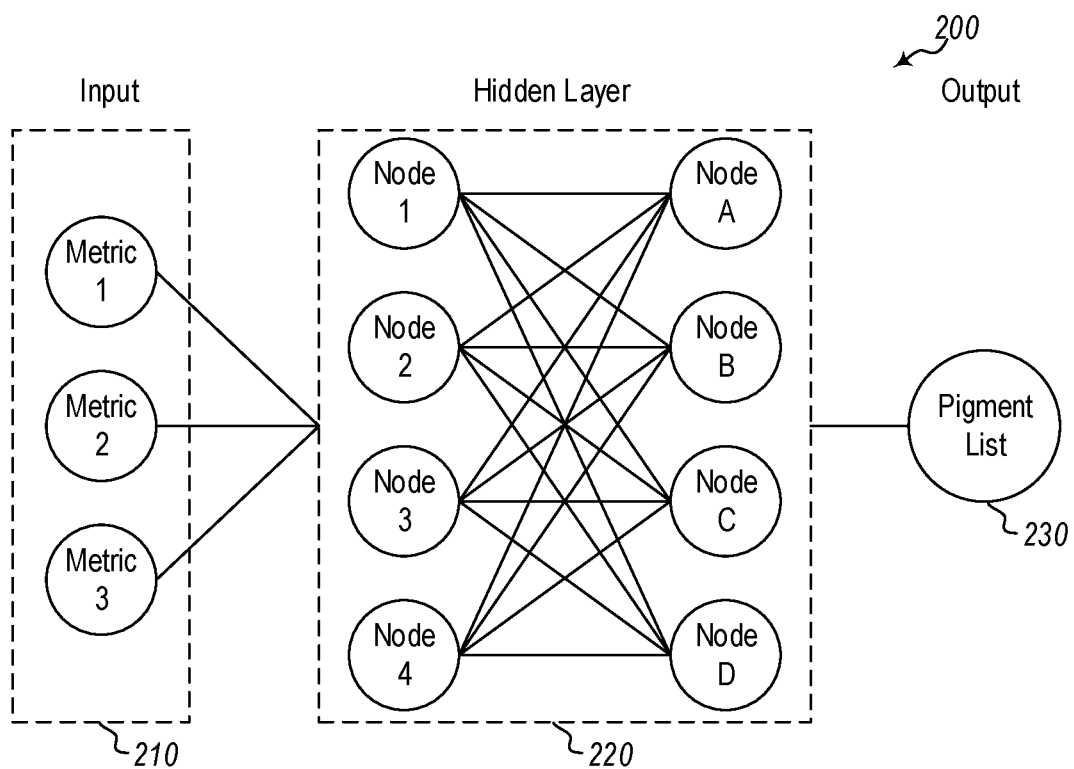
FIG. 2 illustrates a schematic diagram of a probabilistic colorant analysis system.

As further explanation and example of the function of colorant decision points, FIG. 2 illustrates a schematic diagram of a probabilistic colorant analysis system that comprises a set of colorant decision points 200. The depicted colorant decision points 200 are separated into an input group 210, a hidden layer 220, and an output 230. The colorant decision points 200 can be otherwise separated into different sets. Further, the output 230 may comprise information passed to a formulation engine.

The computer system 100 can process colorant decision points 200 within the hidden layer 220 in parallel. For example, FIG. 2 shows that the lines connecting the different colorant decision points 200 to each other do not indicate a flow or order of processing. Instead, the lines indicate probabilistic relations that will be described further below. Additionally, the input group 210 can comprise a set of metrics, such as angle data, related to the spectrometric data for input into the decision points and/or may also comprise a second set of colorant decision points 200 that the system 100 can calculate prior to calculating the first set of colorant decision points 200 within the hidden layer 220. For example, prior to processing the first set of colorant decision points 200 within the hidden layer, the probabilistic colorant analysis software application 102 initiates a second set of colorant decision points 200 within the input group 210. The second set of colorant decision points 200 within the input group 210 are different than the first set of colorant decision points 200 within the hidden layer 220.

The colorant decision points 200 within the input group 210 may comprise broad colorant classification decision points relating to whether the target coating comprises a solid colorant, an effect pigment, and other similar broad colorant classification. The input group 210 can also or alternatively comprise colorant decision points relating to whether the target coating is a stain, enamel, latex, or some other class of coating. Additionally, the probabilistic colorant analysis software application 102 may be capable of processing the colorant decision points 200 within the input group 210 in parallel.

The colorant decision points 200 within the input group 210 may be calculated prior to calculating the colorant decision points 200 within the hidden layer 220. For instance, the probabilistic colorant analysis software application 102 may comprise multiple different sets of colorant decision points 200 that reside within the hidden layer. One particular set of colorant decision points 200 may be directed towards identifying the composition of a stain, while another set of colorant decision points 200 may be directed towards identifying a latex coating. As such, the solutions to the colorant decision points 200 within the input group 210 can determine which set of colorant decision points 200 within the hidden layer to use. Using the input group 210 to identify a particular set of colorant decision points 200 to calculate may increase efficiency within the system by, for example, preventing the unnecessary calculation of stain-based colorant decision points 200 when the underlying target coating is a latex coating. In contrast, in some cases, every available colorant decision point 200 within the hidden layer can be calculated without regard to the results of the colorant decision points 200 within the input group 210.

Figure 3:
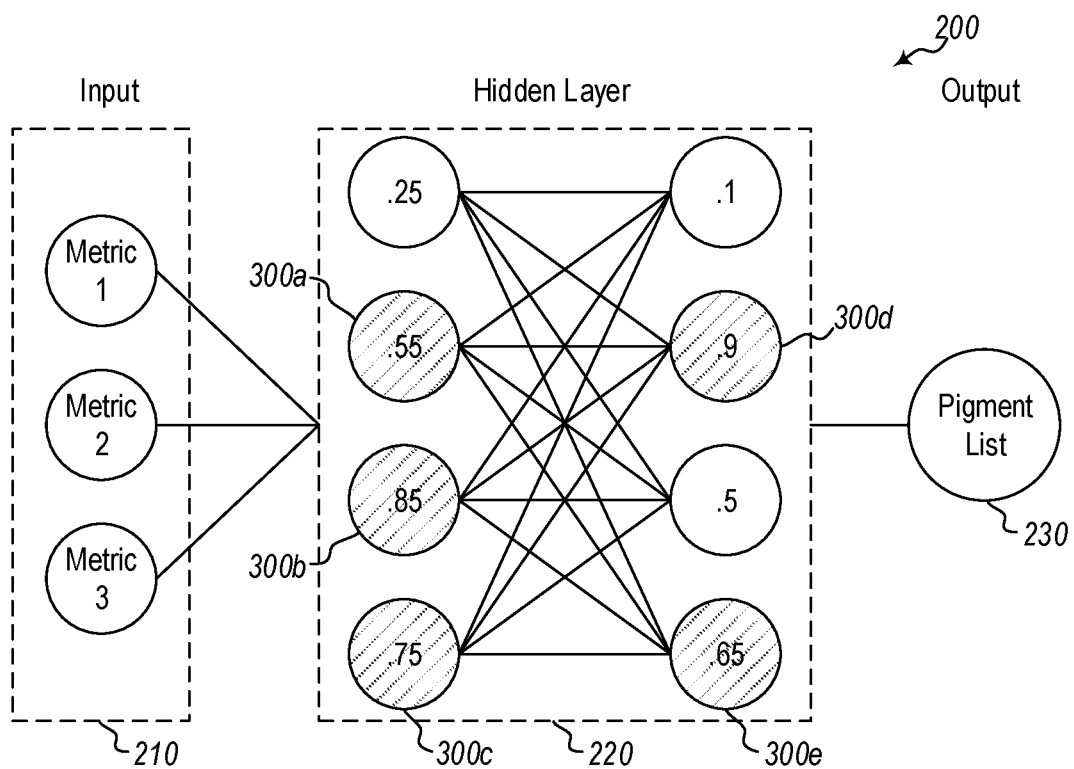
FIG. 3 illustrates a schematic diagram of a probabilistic colorant analysis system in use.

The one or more processors 110(a-c) within the computer system 100 can process the results of the colorant decision points 200 to arrive at a set of final colorant probabilities. For example, FIG. 3 illustrates a schematic diagram of a probabilistic colorant analysis system in use. Similar to the colorant decision points 200 of FIG. 2, FIG. 3 comprises colorant decision points 200 divided into an input group 210, a hidden layer 220, and an output 230.

In FIG. 3 the colorant decision points 200 have been processed and the results are indicated with respect to each of the colorant decision points 200. Once the colorant decision points 200 have been calculated, the decision point manager 150 calculates a set of final colorant probabilities. The set of final colorant probabilities comprise a list of potential colorants that the probabilistic colorant analysis software application 102 identified as possibly being within the target coating 140. Additionally, the set of final colorant probabilities can also comprise a probability associated with each colorant that the colorant is present within the target coating 140.

The system 100 may use different methods and processes to calculate the set of final colorant probabilities. For example, the probabilistic colorant analysis software application 102 can calculate each final colorant probability within the set of final colorant probabilities using a Bayesian analysis. A Bayesian analysis is based on probabilistic reasoning from Bayes' Theorem, which is derived from conditional probability's definition. Bayes Theorem is reproduced below for reference.

$$P(A \mid B) = \frac{P(B \mid A)P(A)}{P(B)}$$

where: $P(B) \neq 0$

When applying a Bayesian analysis, the probabilistic colorant analysis software application 102 gathers the probabilities that were calculated by each of the colorant decision points 200 and processes them using the Bayes Theorem. In particular, relying upon knowledge about general colorant attributes that are stored within the computer-readable media 120 (shown in FIG. 4), the probabilistic colorant analysis software application 102 is aware of particular relationships between a unique subsets of colorant decision points 200 that indicate specific colorants. For example, computer-storage media 120 may store a database of relationships between a unique subset of colorant decision points 200 and specific colorants. As such, the probabilistic colorant analysis software application 102 can identify different subsets of colorant decision points 200 that have high, combined probabilities and then compare these subsets to data stored in computer-storage media 120. The exemplary lines extending between colorant decision points 200 in FIG. 3 indicate these relationships.

For example, in FIG. 3, the probabilistic colorant analysis software application 102 identifies a unique subset of colorant decision points 300(a-e) (shown with striped backgrounds) as relating to a particular potential colorant. The probabilistic colorant analysis software application 102 calculates a final texture probability that indicates the probability that the particular potential colorant is within the target coating 140. The probabilistic colorant analysis software application 102 can calculate the final texture probability by applying a Bayesian analysis to each of the results of the colorant decision points 300(a-e).

Additionally, the probabilistic colorant analysis software application 102 can apply different weightings to each probability within the unique subset of probabilities calculated by the first set of colorant decision points 200. For example, for a particular potential colorant, the probabilistic colorant analysis software application 102 may weight, within the Bayesian analysis, the results of decision point 300a less than the results of decision point 300d. The system 100 may store the various weightings within the computer-readable media 120, including multiple different weightings for each different potential colorant. The different weightings may be based upon previous analysis by the application 102, and/or knowledge of colorant characteristics within the application 102 and/or provided by an end user. Additionally, the probabilistic colorant analysis software application 102 can actively update the weightings based upon feedback provided by an end-user that indicates whether potential colorants were correctly selected.

Figure 4:
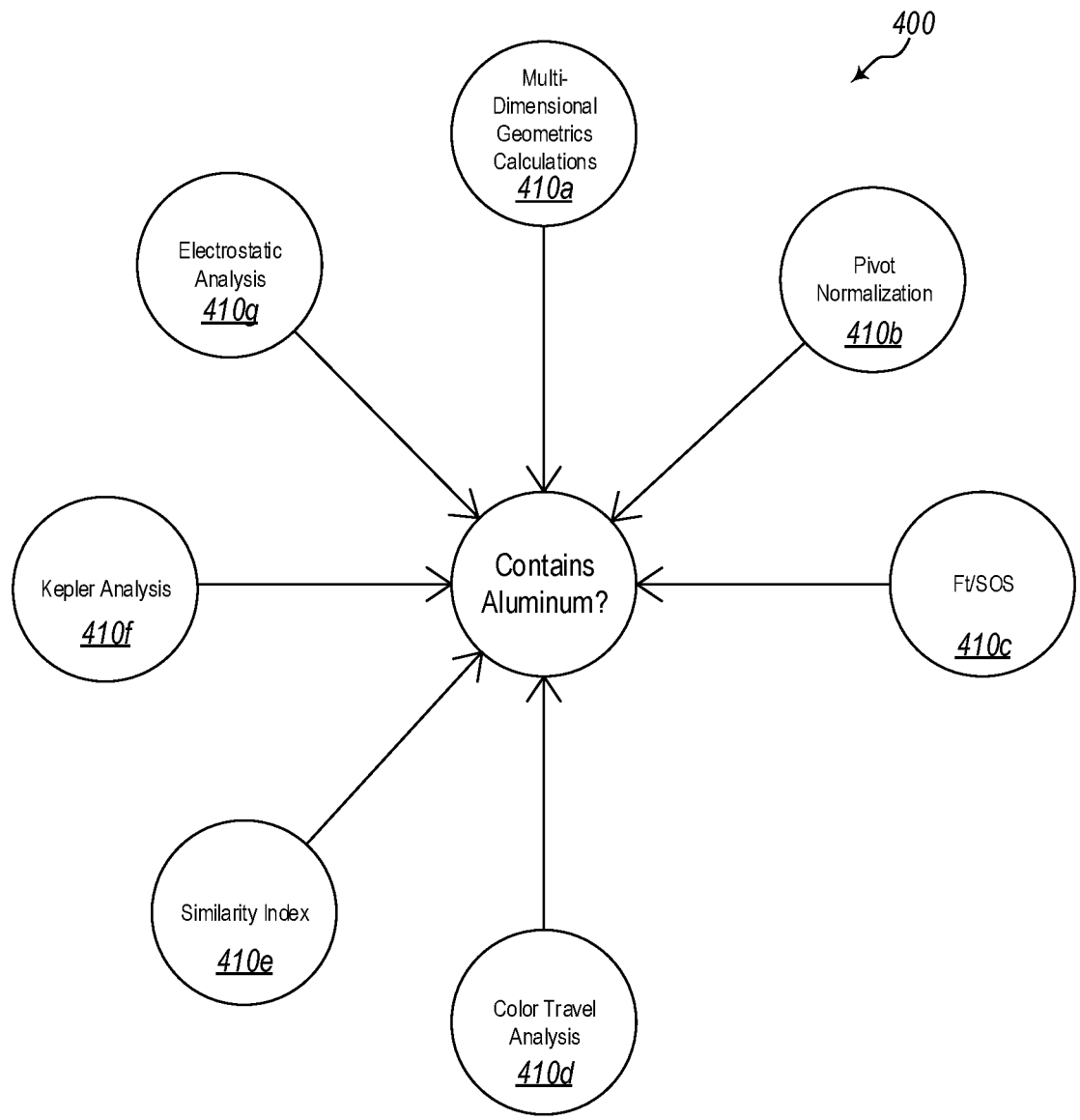
FIG. 4 illustrates a schematic diagram of a colorant decision point within a probabilistic colorant analysis system.

FIG. 4 illustrates a schematic diagram of a particular colorant decision point 400 within a probabilistic colorant analysis system. The depicted particular colorant decision point 400 comprises one or more computer-executable instructions within the application 102, and executes a number of calculations on given inputs, such as inputs from spectrometric data, e.g. received from a spectrophotometer. For example, the colorant decision point 400 can be configured to provide a probability that the target coating 140 contains an aluminum effect pigment type. Colorant decision points executed in the system 100 may also be directed towards providing probabilities that a target coating (e.g., 140) contains effect pigment types such as an organic/natural mica, specific colored micas, a man-made mica, a colored aluminum, particular colors of aluminum, particular sizes of effect particles, and various other effect pigment types.

FIG. 4 shows that the depicted particular colorant decision point 400 can comprise a set of independent calculations 410(a-g) that can include seven different coating-based assessments. For example, independent calculation 410d comprises a calculation relating to the color travel, independent calculation 410f comprises a calculation using Kepler's laws of motion, and calculation 410g comprises a calculation based upon electrostatic characteristics of a target coating 140. While the set of independent calculations 410(a-g) comprises seven specific calculations, the particular colorant decision point 400 may comprise fewer, more, or different independent calculations.

Each colorant decision point 400 can be directed towards identifying a colorant, such as a particular effect pigment type, and each calculation within the set of independent calculations 410(a-g) produces a result that indicates the presence of the particular effect pigment type. The colorant decision point 400 gathers and processes the results of each independent calculation 410(a-g) in order to arrive at a probability that the particular effect pigment type is present within the target coating 140. For example, the colorant decision point 400 may determine that an effect pigment in the form of aluminum flake is present at an 80% probability based on each of the measurements of the target coating 140 for electrostatic analysis 410g, color travel analysis 410d, and Kepler analysis 410f of the received spectrometric data, and with further comparison of the measured/calculated values against those known for other coatings comprising aluminum flake.

When processing the results of the independent calculations, the colorant decision point 400 can calculate a Bayesian probability that the particular effect pigment type is within the target coating 140. For example, the colorant decision point 400 processes results from the independent calculations (generally simultaneously) using a Bayesian analysis in order to produce the probability for the colorant decision point. Additionally, each independent calculation within the set of independent calculations 410(a-g) can be associated with a weighting factor. Because different independent calculations may be more or less accurate, the colorant decision point 400 weights the results of each independent calculation accordingly. Further, the system 100 can normalize the results of each independent calculation so that it reflects a probability that the particular effect pigment type is within the target coating 140.

Accordingly, a first colorant decision point 400 can be directed towards identifying an aluminum effect pigment within a target coating 140. A first set of independent calculations 410(a-g) associated with the first colorant decision point 400 may comprise calculations of the spectrometric data that are specific to providing the independent assessment about the presence of the aluminum effect pigment within the target coating 140.

A second colorant decision point (not shown) can comprise computer-executable instructions used within or in connection with the application 102 and may be directed towards identifying a mica effect pigment within a target coating 140. In order to identify the mica effect pigment, a second set of independent calculations (not shown) may be associated with the second colorant decision point (not shown). The second set of independent calculations may comprise calculations of the spectrometric data that are specific to providing an independent assessment about the presence of the mica effect pigment within the target coating 140. At least a portion of the same independent calculations can be used in both the first colorant decision point 400 and the second colorant decision point. Nevertheless, the system can associate each independent calculation within the first set of independent calculations with a different weighting than the independent calculation within the second set of independent calculations.

Based upon the results of multiple, different colorant decision points (e.g., colorant decision points 200 shown in FIG. 2), the probabilistic colorant analysis software application 102 is able to calculate a set of final colorant probabilities. The set of final colorant probabilities may be a list of all potential effect pigments detected within the target coating 140. Alternatively, the set of final colorants may comprise only a specific portion of the potential colorants.

FIG. 5 illustrates a table comprising spectrometric data 132 (also shown in FIG. 1) received from a spectrophotometer 130 (shown in FIG. 1) for a particular target coating (e.g., 140). In particular, the depicted spectrometric data 132 comprises reflectance data corresponding to a target coating, the reflectance data being received at the listed wavelengths and angles. Each colorant decision point 200 can receive the entire set of spectrometric data 132. Further, at least a portion of the colorant decision points 200 can also receive input data from other devices. For example, the colorant decision points can receive input data from magnetic sensors, hardness sensors, mass spectrometers, user input, or any other data source. The I/O interface 160 (shown in FIG. 1) feeds the received data to the appropriate colorant decision points. Because the colorant decision points 200 are each independently executable, the decision point manager 150 is able to cause the colorant decision points 200 to be processed in parallel without regard to the input data that each receives.

Figures 6, 7:
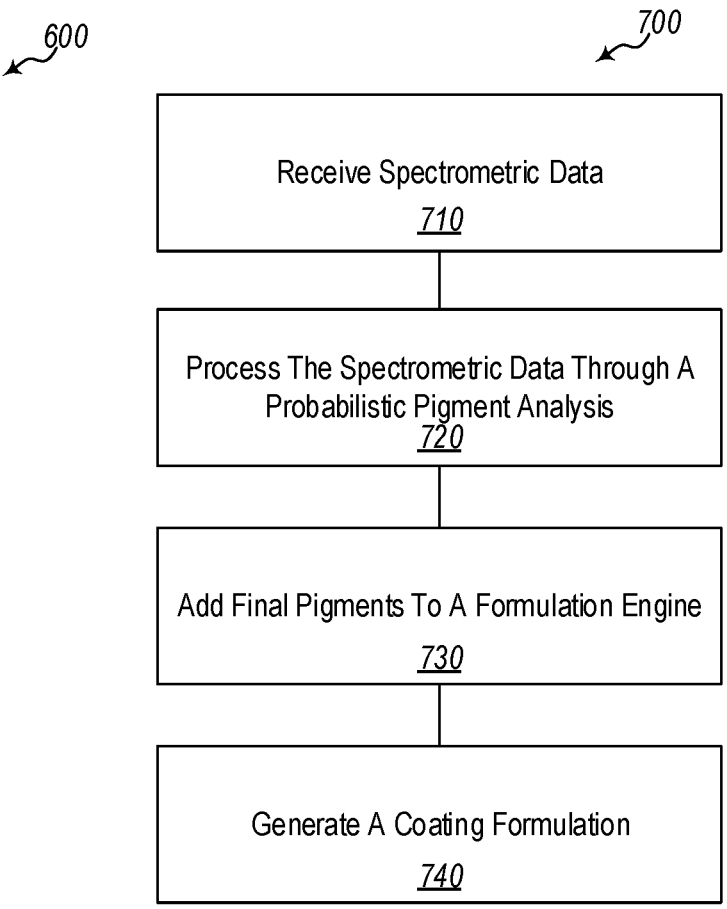
FIG. 6 illustrates a table comprising a set of potential colorants and associated potential colorant probabilities.
FIG. 7 depicts a flow chart of steps within a method for seeding a formulation engine.

FIG. 6 illustrates a table comprising a set of final colorants and associated final colorant probabilities 600. In the depicted table, final colorants are represented by letters in the alphabet. In practice, however, one will appreciate that instead of merely listing a letter in the alphabet, the actual potential colorant would be listed. In addition to listing the different colorants, the table also lists a probability associated with each colorant.

As depicted, at least a portion of colorants are associated with a zero percent probability of being present within the target coating 140. In contrast, some of the colorants are associated with a one-hundred percent chance of being in the target coating 140. One will appreciate that the depicted probabilities are merely exemplary and that in practice the probabilities would range based upon the results from different subset of colorant decision points. Additionally, for the sake of example, at least a portion of the colorants are associated with a priority ordering that is based on the colorants' associated probability. As such, the probabilistic colorant analysis software application 102 provides a set of final colorant probabilities that indicate different colorants and respective probabilities that the different colorants are within a target coating 140.

One will appreciate that the present invention can also be described in terms of methods comprising one or more acts for accomplishing a particular result. For example, FIG. 7 and the corresponding text illustrate flowcharts of a sequence of acts in a method for seeding a formulation engine. The acts of FIG. 7 are described below with reference to the components and modules illustrated in FIGS. 1-7.

For instance, FIG. 7 illustrates that a method 700 for seeding a formulation engine can comprise an act 710 of receiving spectrometric data 132. Act 710 can comprise receiving spectrometric data 132 from a target coating 140. For example, as depicted and described with respect to FIGS. 1 and 4, a spectrophotometer 130 scans a target coating 140. Based upon the scan, the spectrophotometer 130 then sends spectrometric data 132 in the form of reflectance values to the probabilistic colorant analysis software application 102. Alternatively or additionally, spectrometric data 132 can be uploaded from a storage unit to the probabilistic colorant analysis software application 102.

FIG. 7 also illustrates that the method 700 comprises an act 720 of processing the spectrometric data through a probabilistic colorant analysis. Act 720 can include processing the spectrometric data 132 through a probabilistic colorant analysis. The probabilistic colorant analysis generates a set of final colorants. Each final colorant within the set of final colorants being associated with a calculated probability that the associated final colorant is present within the target coating 140. For example, as depicted and described with respect to FIGS. 1, 2, and 5, the probabilistic colorant analysis software application 102 may process the spectrometric data 132 through a system of colorant decision points (shown as 200 in FIG. 2). Based upon the results of the colorant decision points 200, the probabilistic colorant analysis software application 102 may then generate a set of final colorants and associated final colorant probabilities.

Additionally, FIG. 7 illustrates that the method 700 comprises an act 730 of adding final colorants to a formulation engine. Act 730 can include adding at least a portion of the final colorants within the set of final colorants to a formulation engine 170. The portion of the final colorants are added to the formulation engine 170 in order of decreasing calculated probability of the final colorant being present in the target coating. For example, as depicted and described with respect to FIGS. 1 and 5, the probabilistic colorant analysis software application 102 adds the final colorant with the highest probability to the formulation first. The probabilistic colorant analysis software application 102 continues to iteratively add additional colorants to the formulation in order of decreasing probability.

Further, FIG. 7 illustrates that the method 700 comprises an act 740 of generating a coating formulation. Act 740 can include generating, through the formulation engine 170, a coating formulation that is calculated to match the target coating within a predetermined qualitative or quantitative threshold. For example, as depicted and described with respect to FIG. 1, the probabilistic colorant analysis software application 102 continues to iteratively add colorants to the formulation engine 170 until the predetermined qualitative or quantitative threshold is met.

Accordingly, FIGS. 1-7 and the corresponding text illustrate or otherwise describe a number of components, schematics, and mechanisms for seeding a formulation engine. One will appreciate that these components and modules in accordance with the present invention provide fast, flexible, and accurate identification of texture effects within a target coating 140. For example, an end user can scan a target coating 140 with a spectrophotometer 130. In response, a probabilistic colorant analysis software application 102 can process colorant decision points 200 in parallel and produce a set of final colorant probabilities that represent probabilities that particular colorants are present within the target coating 140. The set of final colorants can then be iteratively fed into a formulation engine until a predetermined threshold is met.

The probabilistic colorant analysis can be performed using methods other than a Bayesian analysis and/or decision points. For example, a probability analysis other than a Bayesian analysis can be utilized to generate individual probabilities that colorants are present within a coating. Further, the probabilistic colorant analysis can be directed towards the use of color identification within fabrics, papers, and other products outside of coatings.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may comprise or utilize a special-purpose or general-purpose computer system that includes computer hardware, such as, for example, one or more processors and system memory, as discussed in greater detail below. The present invention can also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, the present invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

A cloud-computing environment may comprise a system that includes one or more hosts that are each capable of running one or more virtual machines. During operation, virtual machines emulate an operational computing system, supporting an operating system and perhaps one or more other applications as well. Each host may include a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

In view of the foregoing the present invention relates for example, without being limited thereto, to the following aspects:

1. A computer-implemented method for seeding a formulation engine making use of a computer system that comprises one or more processors and one or more computer-readable media having stored thereon executable instructions that when executed by the one or more processors configure the computer system to perform in accordance with the method, the method comprising:
   receiving by the computer system spectrometric data related to a target coating;
   processing the spectrometric data, by the one or more processors, through a probabilistic colorant analysis, wherein the probabilistic colorant analysis generates a set of potential colorants, each potential colorant within the set of potential colorants being associated with a calculated probability that the associated potential colorant is present within the target coating;
   adding, by the one or more processors, at least a portion of the potential colorants within the set of potential colorants to a formulation engine, wherein the portion of the potential colorants are added to the formulation engine in an order of decreasing calculated probability of the potential colorant being present in the target coating; and
   generating, by the one or more processors, through the formulation engine, a coating formulation that is calculated to match the target coating within a predetermined qualitative or quantitative threshold.

2. The method of preceding Aspect 1, wherein adding at least a portion of the potential colorants within the set of colorants to a formulation engine comprises:
   iteratively adding, by the one or more processors, potential colorants selected from the set of potential colorants to the formulation engine in an order of decreasing calculated probability of the potential colorant being present in the target coating until the predetermined qualitative or quantitative threshold is met.

3. The method according to preceding Aspect 2, wherein iteratively adding potential colorants comprises:
   adding to the formulation engine, by the one or more processors, a first potential colorant associated with a highest calculated probability of being present in the target coating within the set of potential colorants; and
   when the predetermined qualitative or quantitative threshold is not met, continuing to iteratively add, by the one or more processors, additional potential colorants selected from the set of potential colorants in an order of decreasing calculated probability of the potential colorant being present in the target coating.

4. The method according to any one of the preceding Aspects 1 to 3, wherein processing the spectrometric data through a probabilistic colorant analysis comprises:
   initiating, by the one or more processors, a set of colorant decision points, wherein each colorant decision point comprises a set of independent calculations of the spectrometric data that each provide an independent assessment about the presence of a particular effect pigment type within the target coating;
   calculating in parallel, by the one or more processors, for each colorant decision point within the set of colorant decision points a probability that a different effect pigment type is present within the target coating;

calculating, by the one or more processors, a set of potential colorant probabilities, wherein each potential colorant probability within the set of potential colorant probabilities is calculated by combining a unique subset of the probabilities calculated by the set of colorant decision points; and associating, by the one or more processors, each potential colorant probability with a potential colorant from within the set of potential colorants.

5. The method according to any one of the preceding Aspects 1 to 4, wherein each potential colorant probability within the set of potential colorant probabilities is calculated, by the one or more processors, using a Bayesian analysis.

6. The method according to any one of the preceding Aspects 1 to 5, wherein the formulation engine applies a Kubelka-Munk analysis.

7. The method according to any one of Aspects 1 to 6, further comprising transmitting the generated coating formulation to a paint mixing machine in communication with the computer system and producing the coating formulation by the paint mixing machine.

8. The method according to any one of Aspects 1 to 7, further comprising:

prior to the adding of at least a portion of the potential colorants within the set of potential colorants to the formulation engine, receiving by the computer system input from a user removing one or more colorants from the set of potential colorants.

9. The method according to any one of preceding Aspects 1 to 8, wherein the predetermined qualitative or quantitative threshold is user definable.

10. The method according to any one of preceding Aspects 1 to 9 further comprising measuring spectrometric data from the target coating by a spectrophotometer in communication with the computer system and transferring the spectrometric data to the computer system, where they are received.

11. A computerized system, useful for example for practicing the method according to any one of the preceding Aspects 1 to 10, comprising:

a computer system comprising one or more processors and one or more computer-readable media having stored thereon executable instructions that when executed by the one or more processors configure the computer system to perform at least the following:

receive spectrometric data related to a target coating;

process the spectrometric data through a probabilistic colorant analysis, wherein the probabilistic colorant analysis generates a set of potential colorants, each potential colorant within the set of potential colorants being associated with a calculated probability that the associated potential colorant is present within the target coating;

add at least a portion of the potential colorants within the set of potential colorants to a formulation engine, wherein the portion of the potential colorants are added to the formulation engine in an order of decreasing calculated probability of the potential colorant being present in the target coating; and generate, through the formulation engine, a coating formulation that is calculated to match the target coating within a predetermined qualitative or quantitative threshold.

12. The computerized system according to preceding Aspect 11, wherein adding at least a portion of the potential colorants within the set of potential colorants to a formulation engine comprises:

iteratively adding potential colorants selected from the set of potential colorants to the formulation engine in an order of decreasing calculated probability of the potential colorant being present in the target coating until the predetermined qualitative or quantitative threshold is met.

13. The computerized system according to Aspect 12, wherein iteratively adding potential colorants comprises:

adding to the formulation engine a first potential colorant associated with a highest calculated probability of being present in the target coating within the set of potential colorants; and when the predetermined qualitative or quantitative threshold is not met, continuing to iteratively add additional colorants selected from the set of potential colorants in an order of decreasing calculated probability of the potential colorant being present in the target coating.

14. The computerized system according to any one of Aspects 11 to 13, wherein processing the spectrometric data through a probabilistic colorant analysis comprises:

initiating a set of colorant decision points, wherein each colorant decision point comprises a set of independent calculations of the spectrometric data that each provide an independent assessment about the presence of a particular effect pigment type within the target coating;

calculating in parallel for each colorant decision point within the set of colorant decision points a probability that a different effect pigment type is present within the target coating;

calculating a set of potential colorant probabilities, wherein each potential colorant probability within the set of potential colorant probabilities is calculated by combining a unique subset of the probabilities calculated by the set of colorant decision points; and associating each potential colorant probability with a potential colorant from within the set of potential colorants.

15. The computerized system according to any one of preceding Aspects 11 to 14, wherein each potential colorant probability within the set of potential colorant probabilities is calculated using a Bayesian analysis.

16. The computerized system according to any one of preceding Aspects 11 to 15, wherein the formulation engine applies a Kubelka-Munk analysis.

17. The computerized system according to any one of preceding Aspects 11 to 16, further comprising a paint mixing machine in communication with the computer system for production of the generated coating formulation.

18. The computerized system according to any one of preceding Aspects 11 to 17, wherein the executable instructions further include instructions that are executable by the one or more processors to configure the computer system to:

prior to the adding of at least a portion of the potential colorants within the set of potential colorants to the formulation engine, receive input from a user removing one or more colorants from the set of potential colorants.

19. The computerized system according to any one of preceding Aspects 11 to 18, wherein the predetermined qualitative or quantitative threshold is user definable.

20. The computerized system according to any one of preceding Aspects 11 to 19, wherein each potential colorant within the at least a portion of the potential colorants is associated with a calculated probability above a predetermined threshold probability.

21. The computerized system according to any one of preceding Aspects 11 to 20, further comprising a spectrophotometer in communication with the computer system for measuring spectrometric data from the target coating.

22. A computer program product comprising one or more computer-readable media having stored thereon computer-executable instructions that, when executed at a processor, cause a computer system, such as a computer system being part of a computerized system as defined in any one of preceding Aspects 11 to 21, to perform a method for seeding a formulation engine as defined in any one of preceding Aspects 1 to 10.

The present invention may be embodied in other specific forms without departing from its spirit or essential characteristics. The described preset invention is to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computer system for seeding a formulation engine, comprising:
one or more processors; and
one or more computer-readable media having stored thereon executable instructions that when executed by the one or more processors configure the computer system to perform at least the following:
receive spectrometric data from a target coating;
process the spectrometric data through a probabilistic colorant analysis, the probabilistic colorant analysis generating a set of final colorants, each final colorant within the set of final colorants being associated with a calculated probability that the associated final colorant is present within the target coating, wherein processing the spectrometric data through a probabilistic colorant analysis comprises:
initiating a set of colorant decision points, wherein each colorant decision point comprises a set of independent calculations of the spectrometric data that each provide an independent assessment about the presence of a particular effect pigment type within the target coating,
calculating in parallel each colorant decision point within the set of colorant decision points, wherein each colorant decision point provides a probability that a different effect pigment type is present within the target coating,
calculating a set of final colorant probabilities, wherein each final colorant probability within the set of final colorant probabilities is calculated by combining a unique subset of probabilities calculated by the set of colorant decision points, and
associating each final colorant probability with a final colorant from within the set of final colorants;
add at least a portion of the final colorants within the set of final colorants to a formulation engine, wherein the portion of the final colorants are added to the formulation engine in order of decreasing probability; and
generate, from an output of the formulation engine, a coating formulation that is calculated to match the target coating within a predetermined threshold.

2. The computer system of claim 1, wherein adding at least a portion of the final colorants within the set of final colorants to a formulation engine comprises:
iteratively adding final colorants selected from the set of final colorants to the formulation engine in order of decreasing probability until the predetermined threshold is met.

3. The computer system of claim 2, wherein iteratively adding colorants comprises:
adding to the formulation engine a first colorant associated with a highest probability within the set of final colorants; and
when the predetermined threshold is not met, continuing to iteratively add additional colorants selected from the set of final colorants in order of decreasing probability.

4. The computer system of claim 1, wherein each final colorant probability within the set of final colorant probabilities is calculated using a Bayesian analysis.

5. The computer system of claim 1, wherein the formulation engine applies a Kubelka-Munk analysis.

6. The computer system of claim 1, wherein the executable instructions include instructions that are executable to configure the computer system to communicate the coating formulation to a coating mixing machine for production.

7. The computer system of claim 1, wherein the executable instructions include instructions that are executable to configure the computer system to:
prior to adding the at least the portion of the final colorants within the set of final colorants to the formulation engine, receive input from a user removing one or more colorants from the set of final colorants.

8. The computer system of claim 1, wherein the predetermined threshold is user definable.

9. The computer system of claim 1, wherein each colorant within the at least a portion of the final colorants is associated with calculated probabilities above a threshold probability.

10. The computer system of claim 1, wherein each independent calculation within the set of independent calculations comprises an independent assessment of a presence of a particular effect pigment type within the target coating that does not require as an input the output of any other independent calculation within a respective colorant decision point.

11. A method for seeding a formulation engine, comprising:
receiving spectrometric data from a target coating;
processing the spectrometric data through a probabilistic colorant analysis, wherein the probabilistic colorant analysis generates a set of final colorants, each final colorant within the set of final colorants being associated with a calculated probability that the associated final colorant is present within the target coating;
adding to the formulation engine a first colorant associated with a highest probability within the set of final colorants;
when a predetermined threshold is not met, continuing to iteratively add additional colorants selected from the set of final colorants in order of decreasing probability; and
generating, from an output of the formulation engine, a coating formulation that is calculated to match the target coating within a predetermined threshold.

12. The method of claim 11, wherein processing the spectrometric data through a probabilistic colorant analysis comprises:
- initiating a set of colorant decision points, wherein each colorant decision point comprises a set of independent calculations of the spectrometric data that each provide an independent assessment about the presence of a particular effect pigment type within the target coating;
- calculating in parallel each colorant decision point within the set of colorant decision points, wherein each colorant decision point provides a probability that a different effect pigment type is present within the target coating;
- calculating a set of final colorant probabilities, wherein each final colorant probability within the set of final colorant probabilities is calculated by combining a unique subset of probabilities calculated by the first set of colorant decision points; and
- associating each final colorant probability with a final colorant from within the set of final colorants.

13. The method of claim 12, wherein each independent calculation within the set of independent calculations comprises an independent assessment of a presence of a particular effect pigment type within the target coating that does not require as an input the output of any other independent calculation within a respective colorant decision point.

14. The method of claim 12, wherein each final colorant probability within the set of final colorant probabilities is calculated using a Bayesian analysis.

15. The method of claim 11, wherein the formulation engine applies a Kubelka-Munk analysis.

16. The method of claim 11, further comprising communicating the coating formulation to a coating mixing machine for production.

17. The method of claim 11, further comprising:
- prior to adding the at least the portion of the final colorants within the set of final colorants to the formulation engine, receiving input from a user removing one or more colorants from the set of final colorants.

18. The method of claim 11, wherein the predetermined threshold is user definable.

19. A computer program product comprising one or more computer storage media having stored thereon computer-executable instructions that, when executed at a processor, cause the computer system to perform a method for seeding a formulation engine, the method comprising:
- receiving spectrometric data from a target coating;
- processing the spectrometric data through a probabilistic colorant analysis, the probabilistic colorant analysis generating a set of final colorants, each final colorant within the set of final colorants being associated with a calculated probability that the associated final colorant is present within the target coating, wherein processing the spectrometric data through a probabilistic colorant analysis comprises:
  - initiating a set of colorant decision points, wherein each colorant decision point comprises a set of independent calculations of the spectrometric data that each provide an independent assessment about the presence of a particular effect pigment type within the target coating,
  - calculating in parallel each colorant decision point within the set of colorant decision points, wherein each colorant decision point provides a probability that a different effect pigment type is present within the target coating,
  - calculating a set of final colorant probabilities, wherein each final colorant probability within the set of final colorant probabilities is calculated by combining a unique subset of probabilities calculated by the set of colorant decision points, and
  - associating each final colorant probability with a final colorant from within the set of final colorants;
- adding at least a portion of the final colorants within the set of final colorants to a formulation engine, wherein the portion of the final colorants are added to the formulation engine in order of decreasing probability; and
- generating, from an output of the formulation engine, a coating formulation that is calculated to match the target coating within a predetermined threshold.

* * * * *